United States Patent
Fisera

(10) Patent No.: US 8,664,937 B2
(45) Date of Patent: Mar. 4, 2014

(54) NON-INVASIVE ENERGY CONSUMPTION MONITORING

(75) Inventor: Radek Fisera, Prague (CZ)

(73) Assignee: Honeywell International Inc., Morristown, NJ (US)

( * ) Notice: Subject to any disclaimer, the term of this patent is extended or adjusted under 35 U.S.C. 154(b) by 400 days.

(21) Appl. No.: 13/030,902

(22) Filed: Feb. 18, 2011

(65) Prior Publication Data

US 2012/0212213 A1 Aug. 23, 2012

(51) Int. Cl.
*G01R 15/18* (2006.01)

(52) U.S. Cl.
USPC ............ 324/127; 333/24 R; 340/538.16; 702/61

(58) Field of Classification Search
USPC ............ 324/127, 126; 333/24 R; 364/483, 364/464.04; 340/310.01, 310.07, 538.16; 702/61
See application file for complete search history.

(56) References Cited

U.S. PATENT DOCUMENTS 4,858,141 A * 8/1989 Hart et al. ............... 702/61
7,158,012 B2 * 1/2007 Wiesman et al. ........ 340/538.16

OTHER PUBLICATIONS

George W. Hart, "Nonintrusive Appliance Load Monitoring", IEEE, 1992, 22pgs.*
George W. Hart, "Nonintrusive Appliance Load Monitoring", IEEE, 1992 (22 pgs.).

* cited by examiner

*Primary Examiner* — Patrick J Assouad
*Assistant Examiner* — Sean Curtis
(74) *Attorney, Agent, or Firm* — Brooks, Cameron & Huebsch, PLLC

(57) ABSTRACT

Devices, methods, and systems for non-invasive energy consumption monitoring are described herein. One or more device embodiments include a transformer configured to couple the device to a circuit conductor that is coupled to an additional device, a detection module configured to detect a change in a power signal over the circuit conductor, and a transmission module configured to transmit a unique signal associated with the additional device over the circuit conductor if the change in the power signal meets or exceeds a particular threshold.

20 Claims, 2 Drawing Sheets

NON-INVASIVE ENERGY CONSUMPTION MONITORING

TECHNICAL FIELD

The present disclosure relates to devices, methods, and systems for non-invasive energy consumption monitoring.

BACKGROUND

It can be desirable to monitor (e.g., measure) the energy consumption of a building. For example, an energy meter can be placed at a high level of the utility wiring hierarchy of a building (e.g., at the point at which the utility wiring enters the building), and the energy meter can be used to monitor the total (e.g., overall) energy consumption of the building.

However, such an energy meter located at a high level of the utility wiring hierarchy of a building may not be able to monitor the energy consumption of different types of energy consuming devices within the building. That is, such an energy meter may not be able to distinguish between and/or separately monitor the energy consumption of different types of energy consuming devices within the building.

A Non-Invasive Load Monitor (NILM) device may be placed at the high level of the utility wiring hierarchy of a building to distinguish between and/or separately monitor the energy of different types of energy consuming devices within the building. Different types of energy consuming devices may have different energy consumption signatures associated therewith, and the NILM device can detect changes in the power signal over the utility wiring hierarchy of the building that correspond to the different energy consumption signatures of different types of energy consuming devices within the building. Based on the detected changes in the power signal, the NILM device can determine the type(s) of devices within the building that are consuming energy.

However, NILM devices may not be able to monitor the energy consumption of individual energy consuming devices of a substantially similar type and/or having substantially similar energy consumption signatures within the building. That is, if the building includes multiple energy consuming devices of a substantially similar type and/or having substantially similar energy consumption signatures, the NILM device may not be able to distinguish between them and/or separately monitor their energy consumption.

DETAILED DESCRIPTION

Figure 1:
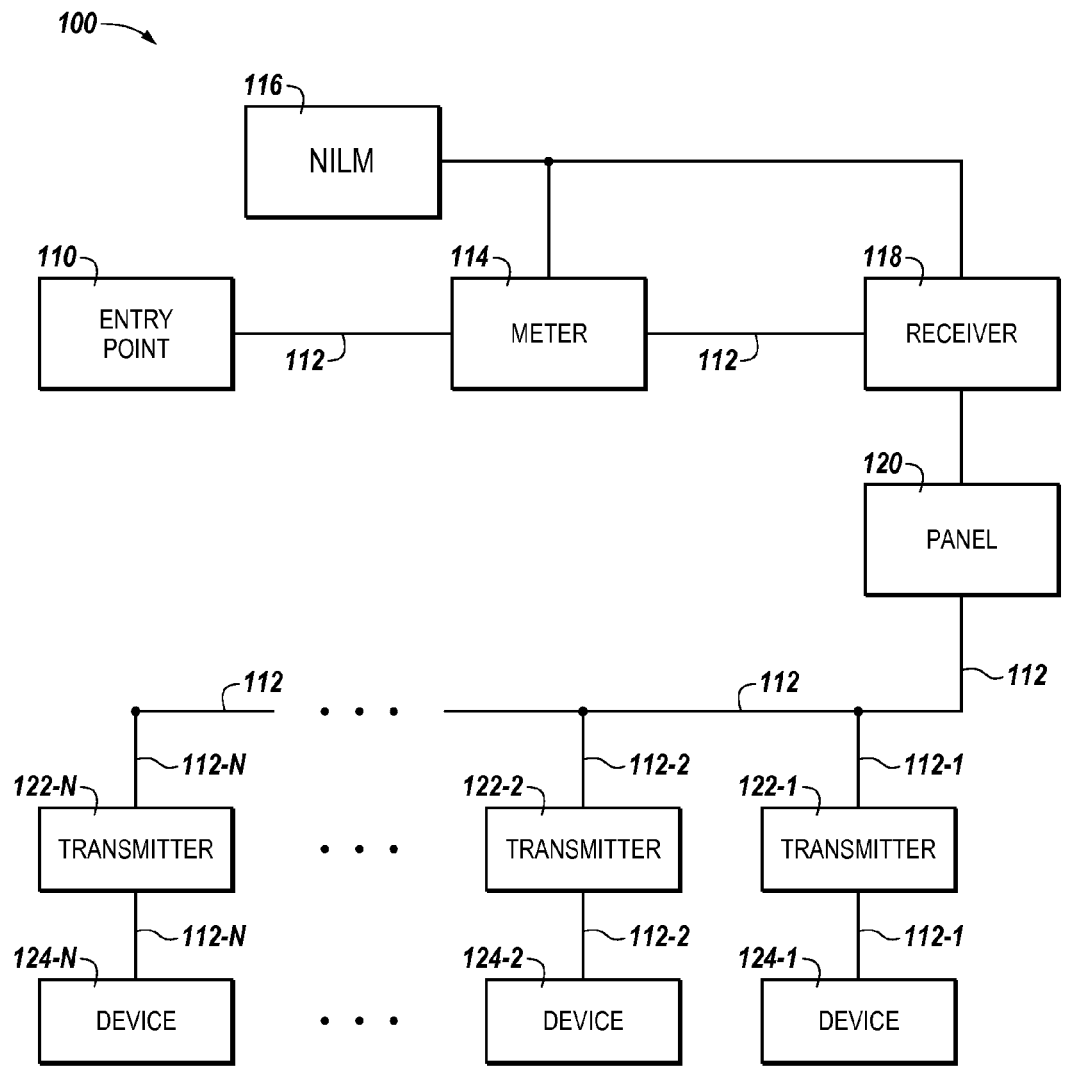
FIG. 1 illustrates a system for non-invasive energy consumption monitoring in accordance with one or more embodiments of the present disclosure.

Devices, methods, and systems for non-invasive energy consumption monitoring are described herein. One or more device embodiments include a transformer configured to couple the device to a circuit conductor that is coupled to an additional device, a detection module configured to detect a change in a power signal over the circuit conductor, and a transmission module configured to transmit a unique signal associated with the additional device over the circuit conductor if the change in the power signal meets or exceeds a particular threshold.

One or more embodiments of the present disclosure can be used to monitor the energy consumption of individual energy consuming devices of a substantially similar type and/or having substantially similar energy consumption signatures within a building. That is, if the building includes multiple energy consuming devices of a substantially similar type and/or having substantially similar energy consumption signatures, one or more embodiments of the present disclosure may be used to distinguish between them and/or separately monitor their energy consumption.

Further, one or more embodiments of the present disclosure can be used to monitor the energy consumption of individual energy consuming devices of a substantially similar type and/or having substantially similar energy consumption signatures within a building in a reliable and/or non-invasive manner. For example, one or more embodiments of the present disclosure can be used to monitor the energy consumption of individual energy consuming devices of a substantially similar type and/or having substantially similar energy consumption signatures within a building without making invasive (e.g., substantial, costly, and/or difficult) changes to the infrastructure of the building or the energy consuming devices whose energy consumption is being monitored. For instance, one or more embodiments of the present disclosure can be used to monitor the energy consumption of individual energy consuming devices of a substantially similar type and/or having substantially similar energy consumption signatures within a building using the existing infrastructure of the building (e.g., the existing utility wiring and/or energy meter(s) of the building) and/or one or more additional devices that can be non-invasively (e.g., cheaply and/or easily) installed within the building.

In the following detailed description, reference is made to the accompanying drawings that form a part hereof. The drawings show by way of illustration how one or more embodiments of the disclosure may be practiced. These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 118 may reference element "18" in FIG. 1, and a similar element may be referenced as 318 in FIG. 3.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

As used herein, "a" or "a number of" something can refer to one or more such things. For example, "a number of devices" can refer to one or more devices. Additionally, the designator "N" as used herein, particularly with respect to reference numerals in the drawings, indicates that a number of the particular feature so designated can be included with a number of embodiments of the present disclosure.

FIG. 1 illustrates a system 100 for non-invasive energy consumption monitoring in accordance with one or more embodiments of the present disclosure. System 100 can, for example, monitor the energy consumption of a building (not shown in FIG. 1). For instance, all or part of system 100 can be located within or adjacent to a building, and/or be associated with a building.

As shown in FIG. 1, system 100 includes an entry point 110. Entry point 110 can be, for example, the utility entry point of the building (e.g., the point at which utility wiring, such as, for instance, electrical wiring, enters the building). Entry point 110 can include, for example, a main switchgear (not shown in FIG. 1).

As shown in FIG. 1, system 100 includes a circuit conductor 112. Circuit conductor 112 can be, for example, an existing power line and/or wire of a power system that enters the building at entry point 110 and delivers power throughout the building. That is, circuit conductor 112 can be part of the existing infrastructure of the building. For instance, circuit conductor 112 can be three-phase wiring of a three-phase power system that enters the building at entry point 110 and carries an AC power signal.

As shown in FIG. 1, circuit conductor 112 can include a number of portions 112-1, 112-2, . . . , 112-N. Each portion 112-1, 112-2, . . . , 112-N of circuit conductor 112 can be, for example, a single-phase wiring of the three-phase power system. Portions 112-1, 112-2, . . . , 112-N of circuit conductor 112 will be further described herein (e.g., in connection with transmitters 122-1, 122-2, . . . , 122-N and devices 124-1, 124-2, . . . , 124-N).

Circuit conductor 112 can be a part of a power line communication (PLC) network. That is, circuit conductor 112 can carry data, such as, for example, data from transmitters 122-1, 122-2, . . . , 122-N, as will be further described herein. The data can be carried by circuit conductor 112 by, for example, impressing a modulated carrier signal containing the data on circuit conductor 112.

As shown in FIG. 1, system 100 includes a meter 114 coupled to circuit conductor 112. Meter 114 can be coupled to circuit conductor 112 at (e.g., meter 114 can be located at) a high level of the hierarchy of circuit conductor 112, as illustrated in FIG. 1. For example, meter 114 can be coupled to circuit conductor 112 at, near, and/or adjacent to entry point 110 (e.g., such that meter 114 receives input from entry point 110), and/or between entry point 110 and portions 112-1, 112-2, . . . , 112-N of circuit conductor 112, as illustrated in FIG. 1.

Embodiments of the present disclosure, however, are not limited to a particular location for meter 114. That is, meter 114 can be located anywhere in the hierarchy of circuit conductor 112. For example, in some embodiments, meter 114 can be located at a lower level of the hierarchy of circuit conductor 112. For instance, meter 114 can be located after (e.g., beyond) panel 120 (e.g., on a branch of circuit conductor 112 that powers a particular set of energy consuming devices).

Meter 114 can be a common meter that monitors (e.g., measures) the total (e.g., overall) energy consumption of the building. In some embodiments (e.g., embodiments in which meter 114 is located at a lower hierarchy level of circuit conductor 112), meter 114 can monitor the energy consumption of a particular set of energy consuming devices in the building. For example, meter 114 can be a simple energy meter or a three-phase advanced electricity meter that can provide total real and/or reactive power readings with a sufficient sampling frequency (e.g., one to five seconds) through a communication interface for automated meter reading (AMR), such as, for instance, ModBus, Ethernet, etc., that has been installed in the building. However, embodiments of the present disclosure are not limited to a particular type of meter.

As shown in FIG. 1, system 100 includes a Non-Invasive Load Monitor (NILM) device 116 coupled to meter 114. NILM device 116 can also be a part of the high level hierarchy with meter 114, as illustrated in FIG. 1. For example, NILM device 116 can receive input from meter 114, as illustrated in FIG. 1. The input from meter 114 can be, for example, the total energy consumption of the building.

NILM device 116 can be, for example, a platform hosting NILM, such as, for instance, an embedded supervisory controller with free processing capability, a laptop, etc. Additionally, NILM device 116 can be coupled to meter 114 by a communication interface, such as, for instance, ModBus. However, embodiments of the present disclosure are not limited to a particular type of NILM device or a particular communication interface for coupling NILM device 116 to meter 114.

NILM device 116 can monitor (e.g., distinguish between and/or separately monitor) the energy consumptions of different types of energy consuming devices. For example, NILM device 116 can detect changes in the power signal over circuit conductor 112 that correspond to different energy consumption signatures of different types of energy consuming devices (e.g., the total real and/or reactive power consumed by different types of energy consuming devices when they are turned on after reaching a steady state). Based on the detected changes in the power signal over circuit conductor 112, NILM device 116 can determine the type(s) of devices that are consuming energy.

As shown in FIG. 1, system 100 includes a receiver device 118 coupled to circuit conductor 112. Receiver 118 can be coupled to circuit conductor 112 at (e.g., receiver 118 can be located at) the high level of the hierarchy of circuit conductor 112, as illustrated in FIG. 1. For example, receiver 118 can be coupled to circuit conductor 112 at, near, and/or adjacent to meter 114 and/or entry point 110, and/or between entry point 110 and/or meter 114 and portions 112-1, 112-2, . . . , 112-N of circuit conductor 112, as illustrated in FIG. 1. Additionally, receiver 118 can be coupled to NILM 116 (e.g., NILM 116 can receive input from receiver 118), as illustrated in FIG. 1.

Receiver 118 can be coupled to circuit conductor 112 (e.g., the existing infrastructure of the building) in a non-invasive (e.g., cheap and/or easy) manner. That is, receiver 118 can be installed in the building in a non-invasive manner using the existing infrastructure of the building (e.g., without making invasive changes to the building). For example, receiver 118 can be clipped onto circuit conductor 112. That is, receiver 118 does not need to be physically interconnected with circuit conductor 112.

Receiver 118 can be coupled to NILM 116 by a communication interface, such as, for instance, ModBus. However, embodiments of the present disclosure are not limited to a particular communication interface for coupling receiver 118 to NILM 116. Receiver 118 will be further described herein (e.g., in connection with FIG. 3).

As shown in FIG. 1, system 100 includes a panel 120 coupled to circuit conductor 112. Panel 120 can be, for example, a heating, ventilating, and air conditioning (HVAC) panel, a lighting panel, a chiller panel, or a ground floor panel, among other types of panels. However, embodiments of the present disclosure are not limited to a particular type of panel.

In the embodiment illustrated in FIG. 1, panel 120 can be the main switchgear of the building, and can distribute power to a number of branches of circuit conductor 112 having a number of energy consuming devices. The embodiment illustrated in FIG. 1 shows one branch of circuit conductor 112 to which panel 120 can distribute power. However, embodiments of the present disclosure are not so limited. For example, system 100 can include a number of additional branches of circuit conductor 112 to which panel 120 can distribute power (not shown in FIG. 1 for simplicity).

As shown in FIG. 1, system 100 includes a number of energy consuming devices 124-1, 124-2, ..., 124-N coupled to circuit conductor 112 (e.g., to a portion 112-1, 112-2, ..., 112-N of circuit conductor 112). In the embodiment illustrated in FIG. 1, each device 124-1, 124-2, ..., 124-N is coupled to a different portion 112-1, 112-2, ..., 112-N of circuit conductor 112. For example, device 124-1 is coupled to portion 112-1 of circuit conductor 112, transmitter 124-2 is coupled to portion 112-2 of circuit conductor 112, etc.

Each portion 112-1, 112-2, ..., 112-N of circuit conductor 112 can carry (e.g., provide and/or input) a power signal (e.g., current) to a different device 124-1, 124-2, ..., 124-N, as illustrated in FIG. 1. That is, each portion 112-1, 112-2, ..., 112-N of circuit conductor 112 can transfer a power signal from circuit conductor 112 to a different device 124-1, 124-2, ..., 124-N For example, portion 112-1 can carry a power signal to device 124-1, portion 112-2 can carry a power signal to device 124-2, etc. Further, the power signal carried over a particular portion 112-1, 112-2, ..., 112-N of circuit conductor 112 can correspond to the energy consumption of the device coupled to that portion. For example, the power signal carried over portion 112-1 can correspond to the energy consumption of device 124-1, the power signal carried over portion 112-2 can correspond to the energy consumption of device 124-2, etc.

Devices 124-1, 124-2, ..., 124-N can be any type of energy consuming device located within or adjacent to the building and/or associated with the building. For example, devices 124-1, 124-2, ..., 124-N can be appliances (e.g., microwaves, refrigerators, etc.), air conditioners, air handling units, pumps, and/or lighting units, among other types of energy consuming devices. However, embodiments of the present disclosure are not limited to a particular type of energy consuming device.

A number of and/or all of devices 124-1, 124-2, ..., 124-N can be a substantially similar type of energy consuming device. That is, a number of and/or all of devices 124-1, 124-2, ..., 124-N can have substantially similar energy consumption signatures (e.g., a number of and/or all of devices 124-1, 124-2, ..., 124-N can consume approximately the same amount of real and/or reactive power when they are turned on after reaching a steady state). For example, in some embodiments, each device 124-1, 124-2, ..., 124-N can have substantially similar energy consumption signatures. However, embodiments of the present disclosure are not so limited.

As shown in FIG. 1, system 100 includes a number of transmitter devices 122-1, 122-2, ..., 122-N coupled to circuit conductor 112 (e.g., to a portion 112-1, 112-2, ..., 112-N of circuit conductor 112). Transmitter devices 122-1, 122-2, ..., 122-N can be, for example, clip-on devices. That is, transmitter devices 122-1, 122-2, ..., 122-N can be coupled to circuit conductor 112 by clipping transmitter devices 122-1, 122-2, ..., 122-N onto circuit conductor 112. Transmitter devices 122-1, 122-2, ..., 122-N will be further described herein (e.g., in connection with FIG. 2).

Transmitter devices 122-1, 122-2, ..., 122-N can be coupled to circuit conductor 112 at a low level of the hierarchy of circuit conductor 112, as illustrated in FIG. 1. For example, transmitters 122-1, 122-2, ..., 122-N can be coupled to portions 112-1, 112-2, ..., 112-N, respectively, of circuit conductor 112 at, near, and/or adjacent to devices 124-1, 124-2, ..., 124-N, respectively, and/or between devices 124-1, 124-2, ..., 124-N and the ends of portions 112-1, 112-2, ..., 112-N, respectively, of circuit conductor 112.

Transmitters 122-1, 122-2, ..., 122-N can be coupled to circuit conductor 112 (e.g., the existing infrastructure of the building) in a non-invasive (e.g., cheap and/or easy) manner. That is, transmitters 122-1, 122-2, ..., 122-N can be installed in the building in a non-invasive manner using the existing infrastructure of the building (e.g., without making invasive changes to the building) and/or without altering devices 124-1, 124-2, ..., 124-N. For example, transmitters 122-1, 122-2, ..., 122-N can be clipped onto circuit conductor 112 (e.g., portions 112-1, 112-2, ..., 112-N of circuit conductor 112), as previously described herein. That is, transmitters 122-1, 122-2, ..., 122-N do not need to by physically interconnected with circuit conductor 112.

Additionally, in the embodiment illustrated in FIG. 1, each transmitter 122-1, 122-2, ..., 122-N is coupled to a different portion 112-1, 112-2, ..., 112-N of circuit conductor 112. For example, transmitter 122-1 is coupled to portion 112-1 of circuit conductor 112 (e.g., the portion of circuit conductor 112 that carries a power signal to device 124-1), transmitter 122-2 is coupled to portion 112-2 of circuit conductor 112 (e.g., the portion of circuit conductor 112 that carries a power signal to device 124-2), etc.

Although the embodiment illustrated in FIG. 1 includes a transmitter coupled to each portion 112-1, 112-2, ..., 112-N of circuit conductor 112, embodiments of the present disclosure are not so limited. For example, a transmitter may not need to be coupled to a portion 112-1, 112-2, ..., 112-N of circuit conductor 112 if the device 124-1, 124-2, ..., 124-N coupled to that portion of circuit conductor 112 is a different type of device (e.g., has a different energy consumption signature) than all of the other devices coupled to the other portions of circuit conductor 112. For instance, if device 124-1 is a different type of device than all of devices 122-2, ..., 122-N, a transmitter may not need to be coupled to portion 112-1 of circuit conductor 112.

Transmitters 122-1, 122-2, ..., 122-N can detect a change in the power signals (e.g., currents) over portions 112-1, 112-2, ..., 112-N of circuit conductor 112. For example, transmitters 122-1, 122-2, ..., 122-N can detect a change in the real and/or reactive power over portions 112-1, 112-2, ..., 112-N of circuit conductor 112. Transmitters 122-1, 122-2, ..., 122-N can detect the change in the power signals over portions 112-1, 112-2, ..., 112-N of circuit conductor 112 by, for instance, converting a voltage proportional to a current in the power signals to a direct current (DC) level corresponding to a root-mean-square (RMS) value, and detecting a change in the RMS value.

Each transmitter 122-1, 122-2, ..., 122-N can detect a change in the power signal over a different portion 112-1, 112-2, ..., 112-N of circuit conductor 112. For example, transmitter 122-1 can detect a change in the power signal over portion 112-1 of circuit conductor 112, transmitter 122-2 can detect a change in the power signal over portion 112-2 of circuit conductor 112, etc.

The change in the power signals over portions 112-1, 112-2, ..., 112-N of circuit conductor 112 can correspond to changes in the energy consumptions of devices 124-1, 124-2, ..., 124-N. For example, a change in the power signal over portion 112-1 of circuit conductor 112 can correspond to a change in the energy consumption of device 124-1, a change in the power signal over portion 112-2 of circuit conductor 112 can correspond to a change in the energy consumption of device 124-2, etc. The changes in the energy consumptions of devices 124-1, 124-2, ..., can correspond to, for example, devices 124-1, 124-2, ..., 124-N being turned on and/or off. For instance, the energy consumption of devices 124-1, 124-2, ..., 124-N may increase when they are turned on, and may decrease when they are turned off.

If the detected change in the power signals over portions 112-1, 112-2, ..., 112-N of circuit conductor 112 meets or exceeds a particular threshold, transmitters 122-1, 122-2, ..., 122-N can generate unique signals associated with devices 124-1, 124-2, ..., 124-N. For example, if the change in the power signal over portion 112-1 of circuit conductor 112 meets or exceeds the particular threshold, transmitter 122-1 can generate a unique signal associated with device 124-1, if the change in the power signal over portion 112-2 of circuit conductor 112 meets or exceeds the particular threshold, transmitter 122-2 can generate a unique signal associated with device 124-2, etc. That is, each device 124-1, 124-2, ..., 124-N can have a unique signal associated therewith (e.g., the unique signal associated with device 124-1 generated by transmitter 122-1 is different than the unique signal associated with device 124-2 generated by transmitter 122-2 and the unique signal associated with device 124-N generated by transmitter 122-N).

The particular threshold can be, for example, a fixed threshold. That is, the threshold at which transmitters 122-1, 122-2, ..., 122-N generate their respective unique signals can be substantially similar for each transmitter 122-1, 122-2, ..., 122-N. This fixed threshold can be, for example, a minimum amount of change in a power signal that can correspond to an energy consuming device being turned on or off.

The generated unique signals associated with devices 124-1, 124-2, ..., 124-N can include, for example, a code indicating that devices 124-1, 124-2, ..., 124-N have been turned on or off. For example, the unique signal associated with device 124-1 can include a code indicating device 124-1 has been turned on or off, the unique signal associated with device 124-2 can include a code indicating device 124-2 has been turned on or off, etc. The unique signals can be, for example, high frequency (HF) signals.

The unique signals associated with devices 124-1, 124-2, ..., 124-N generated by transmitters 122-1, 122-2, ..., 122-N can correspond to a polarity of the change in the current over portions 112-1, 112-2, ..., 112-N of circuit conductor 112. For example, the unique signal associated with device 124-1 generated by transmitter 122-1 can correspond to the polarity of the change in the current over portion 112-1 of circuit conductor 112, the unique signal associated with device 124-2 generated by transmitter 122-2 can correspond to the polarity of the change in the current over portion 112-2 of circuit conductor 112, etc.

Transmitters 122-1, 122-2, ..., 122-N can generate the unique signals associated with devices 124-1, 124-2, ..., 124-N by, for example, receiving the energy from the change in the power signals over portions 112-1, 112-2, ..., 112-N of circuit conductor 112 and transforming the energy into the unique signals. For instance, transmitter 122-1 can generate the unique signal associated with device 124-1 by receiving the energy from the change in the power signal over portion 112-1 of circuit conductor 112 and transforming the energy into the unique signal associated with device 124-1, transmitter 122-2 can generate the unique signal associated with device 124-2 by receiving the energy from the change in the power signal over portion 112-2 of circuit conductor 112 and transforming the energy into the unique signal associated with device 124-2, etc.

Transmitters 122-1, 122-2, ..., 122-N can add the generated unique signals associated with devices 124-1, 124-2, ..., 124-N to the power signals over portions 112-1, 112-2, ..., 112-N of circuit conductor 112, and transmit the unique signals to receiver 118 over circuit conductor 112 as part of the power signals (e.g., using power line communication). For example, transmitter 122-1 can add the unique signal associated with device 124-1 to the power signal over portion 112-1 of circuit conductor 112 and transmit the unique signal associated with device 124-1 to receiver 118 over circuit conductor 112 as part of the power signal, transmitter 122-2 can add the unique signal associated with device 124-2 to the power signal over portion 112-2 of circuit conductor 112 and transmit the unique signal associated with device 124-2 to receiver 118 over circuit conductor 112 as part of the power signal, etc.

Transmitters 122-1, 122-2, ..., 122-N can transmit the unique signals associated with devices 124-1, 124-2, ..., 124-N to receiver 118 over circuit conductor 112 using a modulation scheme. The modulation scheme can be, for example, a frequency modulation scheme, such as, for instance, a frequency shift keying (FSK) modulation scheme or a Gaussian FSK modulation scheme, and/or a phase-shift keying modulation scheme. However, embodiments of the present disclosure are not limited to a particular type of modulation scheme.

Receiver 118 can receive the unique signals associated with devices 124-1, 124-2, ..., 124-N over circuit conductor 112 as part of the power signal over circuit conductor 112, and separate the unique signals from the power signal. Receiver 118 can then determine that devices 124-1, 124-2, ..., 124-N have been turned on or off based, at least in part, on the unique signals. For example, receiver 118 can determine that device 124-1 has been turned on or off based on the unique signal associated with device 124-1 received from transmitter 122-1, receiver 118 can determine that device 124-2 has been turned on or off based on the unique signal associated with device 124-2 received from transmitter 122-2, etc.

Receiver 118 can determine that devices 124-1, 124-2, ..., 124-N have been turned on or off by, for instance, decoding the unique signals associated with devices 124-1, 124-2, ..., 124-N (e.g., decoding the code included in the unique signals indicating that devices 124-1, 124-2, ..., 124-N have been turned on or off). For example, receiver 118 can determine that device 124-1 has been turned on or off by decoding the unique signal associated with device 124-1 (e.g., by decoding the code included in the unique signal indicating that device 124-1 has been turned on or off), receiver 118 can determine that device 124-2 has been turned on or off by decoding the unique signal associated with device 124-2 (e.g., by decoding the code included in the unique signal indicating that device 124-2 has been turned on or off), etc.

Receiver 118 can apply a time stamp to the unique signals associated with devices 124-1, 124-2, ..., 124-N upon receiving the unique signals, separating the unique signals from the power signal, and/or determining that devices 124-1, 124-2, ..., 124-N have been turned on or off. Additionally and/or alternatively, receiver 118 can store (e.g., log) the unique signals associated with devices 124-1, 124-2, ..., 124-N upon receiving the unique signals, separating the unique signals from the power signal, and/or determining that devices 124-1, 124-2, ..., 124-N have been turned on or off.

NILM 116 can access the unique signals stored (e.g., in the log) by receiver 118. For example, NILM 116 can extract the unique signals from receiver 118. That is, receiver 118 can provide the unique signals as an auxiliary (e.g., supplementary) information input into NILM 116 (e.g., into a standard NILM device that is running a steady state load classification).NILM 116 can use the unique signals provided in the auxiliary input from receiver 118, along with the changes in the power signal (e.g., the changes in the magnitude of the real and/or reactive power) over circuit conductor 112 detected by NILM 116, to distinguish between and/or separately monitor energy consuming devices of a substantially similar type and/or having substantially similar energy consumption signatures. In some embodiments, NILM 116 can perform this analysis offline (e.g., NILM 116 can access the unique signals stored by receiver 118 and then process them offline).

Figure 2:
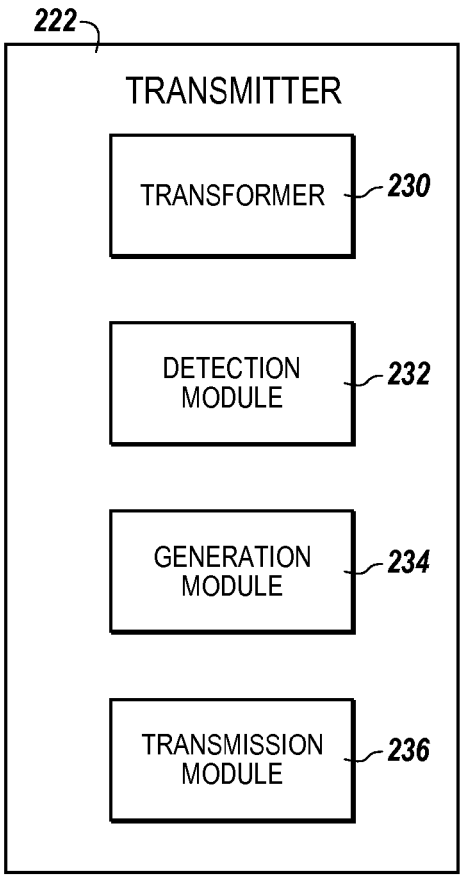
FIG. 2 illustrates a transmitter device for non-invasive energy consumption monitoring in accordance with one or more embodiments of the present disclosure.

FIG. 2 illustrates a transmitter device 222 for non-invasive energy consumption monitoring in accordance with one or more embodiments of the present disclosure. Transmitter device 222 can be, for example, one or more of transmitter devices 122-1, 122-2, . . . , 122-N previously described in connection with FIG. 1.

As shown in FIG. 2, transmitter 222 includes a transformer 230. Transformer 230 can couple transmitter 222 to a circuit conductor (e.g., a portion 112-1, 112-2, . . . , 112-N of circuit conductor 112 previously described in connection with FIG. 1). For example, transformer 230 can transfer a power signal (e.g., current), from the circuit conductor to transmitter 222.

As shown in FIG. 2, transmitter 222 includes a detection module 232. Detection module 232 can detect a change in the power signal over the circuit conductor (e.g., over the portion of the circuit conductor) to which transmitter 222 is coupled. For example, detection module 232 can detect a change in the real and/or reactive power over the circuit conductor. Detection module 232 can detect the change in the power signal over the circuit conductor by, for instance, converting a voltage proportional to a current in the power signals to a direct current (DC) level corresponding to a root-mean-square (RMS) value, and detecting a change in the RMS value.

The change in the power signal over the circuit conductor (e.g., over the portion of the circuit conductor) to which transmitter 222 is coupled can correspond to a change in the energy consumption of an energy consuming device (e.g., energy consuming devices 124-1, 124-2, . . . , 124-N previously described in connection with FIG. 1) coupled to the circuit conductor (e.g., coupled to the portion of the circuit conductor). The change in the energy consumption of the energy consuming device can correspond to, for example, the energy consuming device being turned on and/or off. For instance, the energy consumption of the energy consuming device may increase when it is turned on, and may decrease when it is turned off.

As shown in FIG. 2, transmitter 222 includes a generation module 234. If the change in the power signal over the circuit conductor (e.g., over the portion of the circuit conductor) detected by detection module 232 meets or exceeds a particular threshold, generation module 234 can generate a unique signal. The unique signal can be associated with the energy consuming device coupled to the circuit conductor. Generation module 234 can generate the unique signal by, for example, receiving the energy from the change in the power signal over the circuit conductor, and transforming the energy into the unique signal.

The particular threshold can be, for example, a fixed threshold. The fixed threshold can be, for example, a minimum amount of change in a power signal that can correspond to an energy consuming device being turned on or off.

The unique signal generated by generation module 234 can include, for example, a code indicating that the energy consuming device coupled to the circuit conductor (e.g., coupled to the portion of the circuit conductor) has been turned on or off. The unique signal can correspond to a polarity of the change in the current over the circuit conductor.

As shown in FIG. 2, transmitter 222 includes a transmission module 236. Transmission module 236 can add the unique signal generated by generation module 234 to the power signal over the circuit conductor, and transmit the unique signal to a receiver device (e.g., receiver device 118 previously described in connection with FIG. 1) over the circuit conductor as part of the power signal (e.g., using power line communication). For example, transmission module 236 can transmit the unique signal to the receiver device over the circuit conductor using a modulation scheme, such as, for example, a modulation scheme previously described herein.

Figure 3:
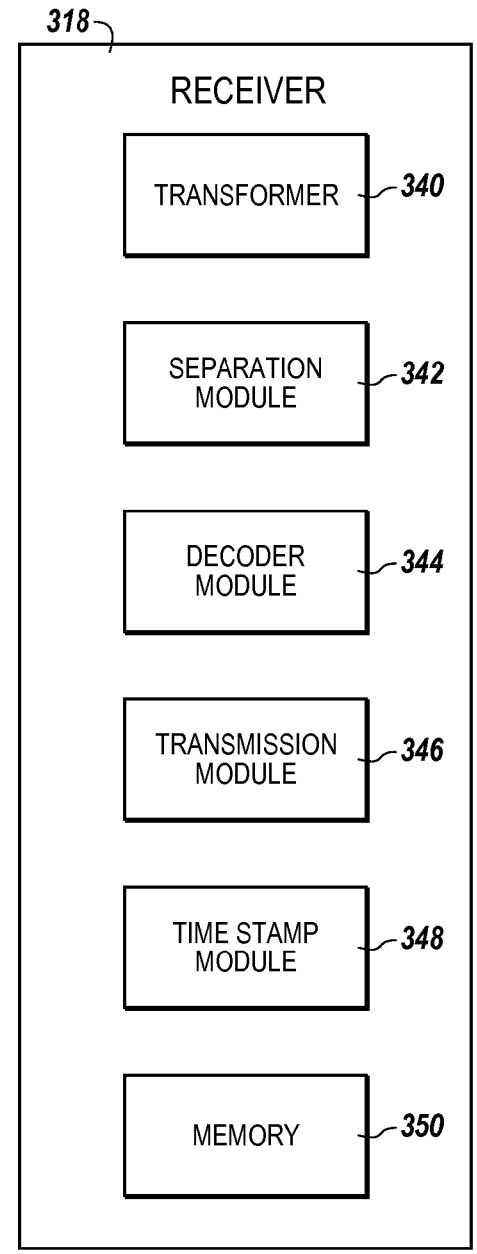
FIG. 3 illustrates a receiver device for non-invasive energy consumption monitoring in accordance with one or more embodiments of the present disclosure.

FIG. 3 illustrates a receiver device 318 for non-invasive energy consumption monitoring in accordance with one or more embodiments of the present disclosure. Receiver device 318 can be, for example, receiver device 118 previously described in connection with FIG. 1.

As shown in FIG. 3, receiver 318 includes a transformer 340. Transformer 340 can couple receiver 318 to a circuit conductor (e.g., circuit conductor 112 previously described in connection with FIG. 1). For example, transformer 340 can transfer a power signal, such as, for example, a power signal that includes the unique signal transmitted from transmitter 222 previously described in connection with FIG. 2, from the circuit conductor to receiver 318.

As shown in FIG. 3, receiver 318 includes a separation module 342. Separation module 342 can separate the unique signal received from transmitter 222 from the power signal.

As shown in FIG. 3, receiver 318 includes a decoder module 344. Decoder module 344 can determine that the energy consuming device coupled to the circuit conductor (e.g., coupled to the portion of the circuit conductor) previously described in connection with FIG. 2 has been turned on or off based, at least in part, on the unique signal received from transmitter 222. Decoder module 344 can determine that the energy consuming device has been turned on or off by, for instance, decoding the unique signal (e.g., decoding the code included in the unique signal indicating the energy consuming device has been turned on or off). Decoder module 344 can include, for example, a correlation receiver having a signal processing capability.

As shown in FIG. 3, receiver 318 includes a transmission module 346. After decoder module 344 determines that the energy consuming device coupled to the circuit conductor has been turned on or off, transmission module 346 can transmit information indicating that the energy consuming device has been turned on or off to a NILM device (e.g., NILM device 116 previously described in connection with FIG. 1). For example, transmission module 346 can transmit signals indicating that the energy consuming device has been turned on or off to the NILM device over a general communication channel between receiver 318 and the NILM device, such as, for example, a serial interface using ModBus protocol, for online analysis. If the communication channel is unavailable, a memory log(e.g., memory 350) can be used for offline analysis.

As shown in FIG. 3, receiver 318 includes a time stamp module 348. Time stamp module 348 can apply a time stamp to the unique signal received from transmitter 222 upon transformer 340 receiving the unique signal from transmitter 222, separation module 342 separating the unique signal from the power signal, and/or decoder module 344 determining that the energy consuming device has been turned on or off.

As shown in FIG. 3, receiver 318 includes a memory 350. Memory 350 can store (e.g., log) the unique signal received from transmitter 222 upon transformer 340 receiving the unique signal from transmitter 222, separation module 342 separating the unique signal from the power signal, and/or decoder module 344 determining that the energy consuming device has been turned on or off.

Memory 350 can be volatile or nonvolatile memory. Memory 350 can also be removable, e.g., portable memory, or non-removable, e.g., internal memory. For example, memory 350 can be random access memory (RAM), read-only memory (ROM), dynamic random access memory (DRAM), electrically erasable programmable read-only memory (EE-PROM), flash memory, phase change random access memory (PCRAM), compact-disk read-only memory (CD-ROM), a laser disk, a digital versatile disk (DVD) or other optical disk storage, and/or a magnetic medium such as magnetic cassettes, tapes, or disks, among other types of memory.

Further, although memory 350 is illustrated as being located in receiver 318, embodiments of the present disclosure are not so limited. For example, memory 350 can also be located internal to another computing resource, e.g., enabling computer readable instructions to be downloaded over the Internet or another wired or wireless connection.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A device for non-invasive energy consumption monitoring, comprising:
   a transformer configured to couple the device to a portion of a circuit conductor that is coupled to a single additional device;
   a detection module configured to detect a change in a power signal over the portion of the circuit conductor; and
   a transmission module configured to transmit a unique signal associated with the single additional device over the circuit conductor if the change in the power signal meets or exceeds a particular threshold.

2. The device of claim 1, wherein the particular threshold is a fixed threshold.

3. The device of claim 1, wherein the unique signal associated with the single additional device includes a code indicating that the single additional device has been turned on or off.

4. The device of claim 1, wherein the transformer is configured to couple the device to a portion of the circuit conductor that transfers the power signal from the circuit conductor to the single additional device.

5. The device of claim 1, wherein the unique signal associated with the single additional device is a high frequency (HF) signal.

6. The device of claim 1, wherein the circuit conductor is a power line.

7. The device of claim 1, wherein the transmission module is configured to transmit the unique signal associated with the single additional device over the circuit conductor using a modulation scheme.

8. A method for non-invasive energy consumption monitoring, comprising:
   detecting a change in a power signal over a portion of a circuit conductor that is coupled to a single device;
   generating a unique signal associated with the single device if the change in the power signal meets or exceeds a particular threshold; and
   transmitting the unique signal associated with the single device over the circuit conductor as part of the power signal.

9. The method of claim 8, wherein the method includes:
   receiving the unique signal associated with the single device over the circuit conductor as part of the power signal;
   separating the unique signal associated with the single device from the power signal; and
   determining that the single device has been turned on or off based, at least in part, on the unique signal associated with the single device.

10. The method of claim 8, wherein generating the unique signal associated with the single device includes:
    receiving energy from the change in the power signal over the portion of the circuit conductor; and
    transforming the energy into the unique signal associated with the single device.

11. The method of claim 8, wherein detecting the change in the power signal over the portion of the circuit conductor includes detecting a change in current over the portion of the circuit conductor.

12. The method of claim 11, wherein the unique signal associated with the single device corresponds to a polarity of the change in current over the portion of the circuit conductor.

13. The method of claim 8, wherein detecting the change in the power signal over the portion of the circuit conductor includes detecting a change in real power and reactive power over the portion of the circuit conductor.

14. The method of claim 8, wherein detecting the change in the power signal over the portion of the circuit conductor includes:
    converting a voltage proportional to a current in the power signal over the portion of the circuit conductor to a direct current (DC) level corresponding to a root-mean-square (RMS) value; and
    detecting a change in the RMS value.

15. A system for non-invasive energy consumption monitoring, comprising:
    a number of devices configured to:
        detect a change in a power signal over a portion of a circuit conductor that is coupled to a single one of a number of additional devices; and transmit a unique signal associated with the single one of the number of additional devices as part of a power signal over the circuit conductor if the change in the power signal meets or exceeds a particular threshold; and a second device configured to:
receive the unique signal associated with the single one of the number of additional devices as part of the power signal over the circuit conductor;
determine that the single one of the number of additional devices has been turned on or off based, at least in part, on the unique signal associated with the single one of the number of additional devices.

16. The system of claim 15, wherein:
each of the number of devices are configured to detect a change in a power signal over a different portion of the circuit conductor;
each of the number of additional devices are coupled to a different portion of the circuit conductor; and
each of the number of additional devices has a unique signal associated therewith.

17. The system of claim 15, wherein each of the number of additional devices have substantially similar energy consumption signatures.

18. The system of claim 15, wherein the second device is configured to transmit information indicating that the single one of the number of additional devices has been turned on or off to a Non-Invasive Load Monitor (NILM) device.

19. The system of claim 15, wherein the second device is configured to determine that the single one of the number of additional devices has been turned on or off by decoding the unique signal associated with the single one of the number of additional devices.

20. The system of claim 15, wherein the second device is configured to:
apply a time stamp to the unique signal associated with the single one of the number of additional devices upon receiving the unique signal; and
store the unique signal associated with the single one of the number of additional devices.

* * * * *